3,400,087
FINELY DIVIDED CALCITE IN COMBINATION WITH A FATTY ALCOHOL AS NUCLEATING AGENTS FOR NYLON POLYAMIDES

Howard E. Robb, George D. Newman, Jr., and Duoyne L. McCullough, Henderson, Ky., assignors to Gulf Oil Corporation, Pittsburgh, Pa., a corporation of Pennsylvania
No Drawing. Filed Sept. 20, 1965, Ser. No. 488,717
13 Claims. (Cl. 260—18)

ABSTRACT OF THE DISCLOSURE

The rate of crystal growth without substantial increase in percent of total crystallization of polyamide melts is obtained by incorporating therein finely divided calcite particles and a fatty alcohol.

---

This invention relates to polyamide compositions and, more particularly, to modified polyamides of the nylon type.

The addition of nucleating agents in melts of polyamide resins, of the nylon type, for inducing crystallization, and to control the size thereof is known as, for example, in U.S. Patent 3,080,345, granted Mar. 5, 1963 to Richard E. Brooks et al. In general, such processes have involved the seeding polyamide melts with trace amounts of compatible nucleating agents which increase the number of crystals formed, i.e., total crystallization for purposes of controllably reducing the dimensions of crystallites formed. However, such prior art use of nucleating agents has involved a substantial increase in the percentage of total crystallization without any substantial effect on the rate of crystal growth.

Accordingly, it is an object of this invention to increase the rate of crystal growth in polyamide melts upon cooling thereof.

It is another object of this invention to accelerate crystal growth in polyamide melts, upon solidification thereof, with only slight or substantially no increase in percent of total crystallization.

Other objects and advantages will become more apparent hereinafter.

It has been discovered that finely divided calcite in combination with a fatty alcohol is a very effective nucleating agent in polycarbonamide melts for effecting accelerated growth of crystals when the melt solidifies without any substantial increase or, at most, only a slight increase in the percentage of total crystallization. However, when an increase in total crystallization does occur, the increase does not normally exceed about 10 percent. Nevertheless, even when such increases in crystallization do occur they are not detrimental since they serve to improve the properties of the resins, resulting in higher levels of stiffness, hardness, toughness and the like, together with high flow characteristics and an optimum level of crystallinity. As a result, this acceleration of crystal growth permits a faster set-up of the resin with accompanying shorter processing time requirements and fabricating operations without any substantial modification of the molding conditions normally employed with conventional polycarbonamide resins containing no nucleating agents. These shorter processing requirements are reflected in the shorter set-up time in the mold before the mold is opened and the molded article ejected. Thus, in summary, the principal benefits of this invention are reflected in faster processing cycles, during fabricating operations, of at least a minimum of about 10 percent and up to as high as about 50 percent, improved thermal stability, improved toughness and improved appearance and surface hardness. Economically, the substantial speed-up in time it takes for crystals to form translates to lower processing costs and improved quality. For example, cycle reductions of 22, 35 and 50 percent translate into, respectively, productivity gains of 29, 53 and 100 percent.

The invention provides distinct advantages in a variety of demanding, melt shaping, fabrication applications such as in the manufacture of coils, bobbins, fasteners, window hardware, and the like. The polycarbonamide/calcite resin compositions work equally well in family molds, multicavity molds, plunger machines, screw machines, and the like.

In general, the invention is applicable to the conventional and commercial nylon and polyamide resins having recurring amide groups as integral parts of a molecular chain structure characterized by amide links and hydrocarbon links along the chain. Typical of the polycarbonamides is the product commercially known as nylon 6 which is obtained by the polymerization of caprolactam. Another typical polycarbonamide is that obtained by the condensation of a dibasic acid (e.g., adipic and sebacic) and a diamine (e.g., hexamethylene diamine). A further illustrative polycarbonamide is the copolymer of an amino acid or the lactam thereof e.g., caprolactam), a dibasic organic acid (e.g., isophthalic acid) and a diamine (e.g., m-xylylene diamine). In general, these polycarbonamides will have a molecular weight in excess of 20,000.

More specifically, the finely divided calcite can be of any commercial grade presently available as, for example, that sold under the trade name of Calcium Carbonate P 1–2, having a particle size of 147 microns which has been found suitable for use in this invention. Normally, for most applications within the scope of this invention, the calcite can have a particle size in the range of about 40 or smaller to a maximum of about 200 microns. For purposes of general information, it is noted that calcite is a mineral composed of calcium carbonate crystallized in hexagonal form which readily cleaves into rhombohedrons. Calcite is derived from minerals such as limestone, chalk, marble, Iceland spar, etc.

The calcite can be incorporated into the polycarbonamide in a number of ways to form the compositions of this invention. In general, the calcite can be added to the polycarbonamide at any convenient time prior to solidification of the final shaped article. For example, granules of the polycarbonamide resin can be admixed with the calcite by tumbling the polycarbonamide granules with finely divided calcite whereby the calcite becomes coated on the surface of the granules where it becomes absorbed thereon. The calcite coated granules of the polycarbonamide can then be forced through an extruder for blending and then cut or subdivided into granules or pellets of any desired convenient size as, for example, pellets of 0.0625 inch length and diameter, or of 0.125 inch length and diameter. Alternatively, the calcite coated granules of the polycarbonamide can be fed directly into any suitable melt shaping fabricating machine such as an injection-molding machine (either of the plunger or screw type) or to any other forming device.

Also, as will be appreciated, the calcite coated polycarbonamide granules can be blended together by means of other conventional techniques such as mill mixing, Banburying, or mixing screws.

Usually, the amounts of finely divided calcite incorporated with the polycarbonamide in the compositions of this invention range from about 0.05 to about 0.5 percent, and preferably from about 0.10 to about 0.30 percent, by weight, of the final composition. These amounts are generally sufficient to induce the desired acceleration of crystal growth in solidifying polycarbonamide melts. Larger amounts of the finely divided calcite can be used; however, such increased amounts of the calcite also increases the number of sites for nucleation of crystals with attendant increase of total crystallization and modification of physical properties. Thus, where such increase in crystallization and modification of properties is desired for special applications, increased amounts of calcite can be advantageously employed since the advantages of accelerated crystal growth are retained.

The fatty alcohols, co-acting with the calcite, include the fatty alcohols containing from 10 to 22 carbon atoms as, for example, decanol, stearyl alcohol, cetyl alcohol, docosanol, docosenol and the like. Normally, the fatty alcohols will be added in amounts in the general range of about 0.50 to about 2.00 weight percent, and preferably from about 1.15 to about 1.25 weight percent based on the final polycarbonamide composition. These fatty alcohols perform a dual function, since in addition to their co-action with the calcite in facilitating acceleration of crystal growth, the fatty alcohols also serve their usual function as mold release agents. The fatty alcohols can be incorporated in the polycarbonamides by the usual known techniques conventional in the art, either together with the calcite or separately prior to or after the addition of the calcite. It is only essential that the fatty alcohol be added prior to the final desired fabricating operation.

It was also found that the calcite is compatible with conventional additives normally employed in polycarbonamides as, for example, lubricants, light stabilizers, pigments, dyes, fillers, plasticizers, and the like. In particular, the calcite is compatible and effective with lubricating agents such as metal salts of fatty acid containing from about 10 to about 22 carbon atoms as, for example, sodium stearate, zinc stearate, and the like, added in amounts of about 0.04 to about 0.20 percent, by weight, based on the final composition.

In general, the polycarbonamide compositions of this invention can be employed in any conventional melt shaping devices or equipment such as extruders, injection molding devices, and compression molding devices, and therein shaped into various useful articles. The compositions can be shaped into film, sheets, tubes, rods, household articles, and into various hardware fixtures for automobiles, machinery, windows, plumbing, and the like.

The following examples are set forth for purposes of illustrating the invention, with the proportions of ingredients set forth in parts and percentages, by weight, unless otherwise indicated.

EXAMPLE I

In this example a granulated commercial grade of a polycaprolactam nylon resin was employed. This was an acetic acid catalyzed nylon formulated to contain 0.80 weight percent of stearyl alcohol, and with a solution viscosity of 2.22 dl./g. (measured at 25° C. as 1.0 weight percent solution in 90 percent formic acid).

A portion of this nylon was admixed with 0.1 weight percent of finely divided calcite (having a particle size of 147 microns) by tumbling for one hour in a Patterson blender. The final calcited-nylon formulation is identified in Table I as composition 3. The remaining portion of this nylon was not treated with calcite and is identified in Table I as composition 1. Test specimens were prepared from each portion by injection molding in a 2 oz. Van Dorn machine using a two cavity comb die. The molding conditions for the preparation of the test specimens, in the form of combs, was as follows: injection pressure—875 p.s.i., mold temperature—160° F., cylinder temperature—520° F. The cylinder temperatures and mold temperatures were held constant throughout the evaluations of this example.

A second batch of a granulated commercial grade of polycaprolactam nylon was also employed in this example. This second batch was identical to the first with the exception that this commercial grade of nylon does not contain any fatty alcohols or mold release agents. Twenty-five pounds of this nylon resin was heated to 150° F. and charged to a Patterson blender together with 0.8 weight percent (based on the nylon resin) of stearyl alcohol and the blender rotated for one hour. This alcohol/nylon formulation was then coated by admixing with 0.1 weight percent of finely divided 147 micron calcite (based on the alcohol/nylon formulation) by coating the treated nylon with the calcite in a tumbling procedure as with the first batch. This calcited batch is identified in Table I as composition 4.

Comb-shaped test specimens were prepared from the calcite coated nylon/alcohol resin of this second nylon batch in the same equipment and under identical conditions employed with the first batch of nylon.

For comparative purposes a third batch of a granulated commercial grade of polycaprolactam nylon was also employed. This was a phosphoric acid catalyzed nylon formulated to contain 0.8 weight percent of stearyl alcohol. No calcite was employed with this nylon. This calcite-free nylon is identified in Table I as composition 2.

Comb-shaped specimens were prepared from the uncoated and the calcite coated nylon portions of this third batch of nylon in the same equipment and under identical conditions employed with the first batch of nylon.

The objective in this evaluation was to determine the fastest cycle that could be employed for the molding operation where the molded combs would be automatically ejected from the mold. The point at which this would take place was determined by maintaining the injection time and die cooling to a minimum with injection pressure as high as required to fill the mold. The die cooling time was then gradually increased and the injection pressure decreased until the combs were automatically ejected. The results are given below in Table I.

TABLE I

| Composition | 1 | 2 | 3 | 4 |
|---|---|---|---|---|
| Calcite, percent | | | 0.1 | 0.1 |
| Stearyl alcohol, percent | 0.80 | 0.80 | 0.80 | 0.80 |
| Solution viscosity | 2.22 | 2.54 | 2.25 | 2.47 |
| Cycle (secs.): | | | | |
| Injection | 5 | 10 | 5 | 10 |
| Charge | 3 | 3 | 3 | 3 |
| Die cooling | 30 | 35 | 28 | 20 |
| Ejection | 4 | 4 | 3 | 3 |
| Total cycle time (secs.) | 42 | 52 | 39 | 36 |

EXAMPLE II

This example is given to show the effect of calcite (having a particle dimension of 147 microns) on the physical properties of two commercial grades of caprolactam nylons, each containing 0.8 weight percent of stearyl alcohol. The first base nylon was an acetic acid catalyzed type resin having an inherent viscosity of 2.20 dl./gm., as measured in 90 percent formic acid at 25° C. A portion of this base nylon was admixed (by a tumbling operation) with 0.2 percent of the finely divided calcite (composition 2 in Table II), and a second portion of this base nylon, free of calcite was used as a control (composition 1 in Table II).

The second base nylon was a phosphoric acid catalyzed type resin having an inherent viscosity of 2.56 dl./gm. A first portion of this second base nylon was admixed, by tumbling, with 0.1 percent of the calcite (composition 3, in Table II), and a second portion of this nylon was admixed, by tumbling, with 0.2 percent of the calcite (composition 4 in Table II).

Specimens for physical property determination were molded under two different conditions. One-half inch thick specimens for Izod Impact (i.e., ½″ x ½″ x 2½″) and flexural stiffness measurements were molded in a two ounce Van Dorn and a five cavity specimen mold under the following conditions:

| | |
|---|---|
| Injection _____secs. | 30 |
| Charge _____secs. | 5 |
| Dies cooling _____secs. | 60 |
| Ejection _____secs. | 4 |
| Injection pressure, p.s.i., as required to fill. | |
| Mold temperature _____° F. | 190 |
| Nozzle temperature _____percent. | 80 |
| Cylinder temperature, ° F.: | |
| Rear _____ | 450 |
| Front _____ | 500 |

Additional tensile and Izod Impact (⅛″ x ½″ x 2½″) specimens were molded in a two ounce Van Dorn and a single cavity ASTM D638–61T Type I tensile specimen mold under the following conditions:

| | |
|---|---|
| Injection _____secs. | 15 |
| Charge _____secs. | 1 |
| Dies cooling _____secs. | 40 |
| Dies open _____secs. | 4 |
| Injection pressure, p.s.i., as required to fill cavity. | |
| Mold temperature _____° F. | 190 |
| Nozzle _____percent. | 70 |
| Cylinder temperature, ° F.: | |
| Rear _____ | 420 |
| Front _____ | 480 |

Physical properties were determined in the "as molded" and conditioned state. Specimens were conditioned in 50 percent relative humidity at 73° F. for two weeks. The results of the experiments are set forth in Table II below:

TABLE II

| Composition | 1 | 2 | 3 | 4 |
|---|---|---|---|---|
| Calcite, percent | | 0.2 | 0.1 | 0.2 |
| Stearyl Alcohol, percent | 0.80 | 0.80 | 0.80 | 0.80 |
| Inherent Viscosity (of base nylon) | 2.20 | 2.20 | 2.56 | 2.56 |

PHYSICAL PROPERTIES

| Property | Composition | | | |
|---|---|---|---|---|
| | 1 | 2 | 3 | 4 |
| ASTM No. D638–61T: | | | | |
| Yield Point, p.s.i.: | | | | |
| As molded | 11,500 | 11,900 | 11,600 | 11,900 |
| Conditioned [1] | 7,900 | 8,500 | 7,650 | 7,950 |
| Tensile Strength, p.s.i.: | | | | |
| As molded | 11,500 | 11,900 | 11,600 | 11,900 |
| Conditioned [1] | 7,900 | 8,500 | 10,250 | 10,700 |
| Elongation, percent: | | | | |
| As molded | 108 | 36 | 64 | 50 |
| Conditioned [1] | 240 | 149 | 255 | 285 |
| ASTM No. D747–61T: | | | | |
| Flexural Stiffness, p.s.i.: | | | | |
| As molded | 252,000 | 304,800 | 282,400 | 274,300 |
| Conditioned [1] | 100,000 | 101,000 | 80,000 | 96,000 |

½″ x ½″ X 2½″ specimens

| | | | | |
|---|---|---|---|---|
| ASTM No. D256–56: | | | | |
| Izod Impact, ft. lbs. per in. notch: | | | | |
| As molded | 0.37 | 0.38 | 0.41 | 0.39 |
| Conditioned [1] | 0.89 | 0.51 | 0.72 | 0.67 |

⅛″ x ½″ x 2½″ specimens

| | | | | |
|---|---|---|---|---|
| As molded | 0.87 | 0.90 | | |
| Conditioned [2] | 12.59 | 8.00 | | |
| ASTM No. D785–62: | | | | |
| Hardness-Rockwell: As molded, R-Scale | 118 | 120 | | |

[1] Conditioned in 50 percent relative humidity at 25° C. for two weeks.
[2] Conditioned to 2.5 percent moisture in 65 percent relative humidity at 80° C.

EXAMPLE III

Additional experiments were made to compare the impact characteristics of calcite nucleated nylons and non-nucleated commercial nylons modified to contain ground titanium dioxide for pigmentation. A commercial grade of nylon (same as composition 1 in Table II) was selected having an inherent viscosity of 2.20 dl./g. and containing 1.25 percent stearyl alcohol. A portion of this base nylon was admixed, by tumbling, with 0.2 weight percent (based on the final composition) of calcite (having a particle size of 147 microns) and with 0.025 weight percent (based on the final composition) of ground titanium dioxide. The remaining portion was untreated.

Each of the portions, base nylon and additive modified nylon, was molded using two mold temperatures of 70° F. and 180° F. To obtain Izod Impact data, a total of 120 specimens were molded each on each resin. This allowed ten compositions at three different conditions of moisture content for each of the two mold temperatures employed. The test specimens were cut from the center section of the prescribed ASTM tensile specimens. The specimens were tested in accordance with the ASTM 256–56 specified test for Izod Impact.

The dimensions of the specimens were 2½′ x ½″ x ⅛″. The molding conditions were maintained constant for each composition and the pressure was varied as necessary to fill the mold. The specific conditions employed are set forth below in Table III.

TABLE III [1]

| Composition | 1 | 2 | 3 | 4 |
|---|---|---|---|---|
| Calcite, percent | | | 0.2 | 0.2 |
| Stearyl alcohol, percent | 0.80 | 0.80 | 1.25 | 1.25 |
| Titanium dioxide | | | 0.025 | 0.025 |
| Injection (secs.) | 15 | 15 | 15 | 15 |
| Charge (secs.) | 1 | 1 | 1 | 1 |
| Dies cooling (secs.) | 15 | 15 | 15 | 15 |
| Ejection (secs.) | 4 | 4 | 4 | 4 |
| Injection pressure, p.s.i. | 1,200 | 900 | 1,025 | 1,000 |
| Mold temperature, ° F | 70 | 180 | 70 | 180 |
| Nozzle temperature, percent | 80 | 80 | 80 | 80 |
| Cylinder temperature, ° F.: | | | | |
| Rear | 420 | 420 | 420 | 420 |
| Front | 500 | 500 | 500 | 500 |

[1] Equipment—Two ounce Van Dorn and five cavity ASTM D638–61T specimen mold.

Physical testing of the specimens was conducted on a Testing Machine Inc. tester, ASTM 256–56, Method A in the Izod test in which the specimen is held as a cantilever beam and is struck by a blow delivered at the recommended fixed distance from the edge of the specimen clamp. Ten specimens of each composition and for each mold temperature were notched and tested in the "as molded" state. Ten specimens of each composition and for each mold temperature were notched and conditioned to 0.3 percent moisture and tested. Ten specimens for each composition and for each mold temperature were notched, conditioned to 2.5 percent, and tested. The results of the impact value obtained are given below in Table IV.

TABLE IV

| Composition | 1 | 2 | 3 | 4 |
|---|---|---|---|---|
| Calcite, percent | | | 0.2 | 0.2 |
| Stearyl alcohol, percent | 0.80 | 0.80 | 1.25 | 1.25 |
| Titanium dioxide | | | 0.025 | 0.025 |
| Mold temperature, ° F | 70 | 180 | 70 | 180 |
| Specimens as molded containing 0.08% moisture: Izod Impact, ft. lb./inch notch | 0.84 | 0.85 | 0.82 | 1.05 |
| Specimens conditioned to 0.3% moisture: Izod Impact, ft. lb./inch notch | 1.02 | 1.12 | 1.03 | 1.25 |
| Specimens conditioned to 2.5% moisture: Izod Impact, ft. lb./inch notch | 8.21 | 8.13 | 6.26 | 7.88 |

Although the invention has been described with reference to specific materials, embodiments and details, various modifications and changes, within the scope of the invention, will be apparent to one skilled in the art and are contemplated to be embraced within the invention.

We claim:

1. A composition comprising a polycarbonamide containing from about 0.05 to about 0.50 percent of said composition, by weight, of finely divided particles of calcite having a particle size not greater than about 200 microns and from about 0.50 to about 2.00 percent of said composition, by weight, of fatty alcohol containing from 10 to 22 carbon atoms.

2. The composition of claim 1 wherein said polycarbonamide is a polycaprolactam and wherein said fatty alcohol is selected from the group consisting of stearyl alcohol and cetyl alcohol.

3. The composition of claim 2 including from about 0.04 to about 0.20 percent of said composition, by weight, of a lubricating agent selected from metal salts of stearic acid.

4. The composition of claim 1 including from about 0.04 to about 0.2 percent of said composition, by weight, of a metal salt of a fatty acid as a lubricating agent for said compostiion, said fatty acid containing from 10 to 22 carbon atoms.

5. A shaped nylon article comprising polycaprolactam containing from about 0.05 to about 0.50 percent of said article, by weight, of finely divided calcite having a particle size of about 200 microns, from about 0.50 to about 2.00 percent of said article, by weight, of a fatty alcohol containing from 10 to 22 carbon atoms.

6. A process for fabricating shaped articles comprising forming a shaping composition by admixing a polycarbonamide with (a) from about 0.05 percent to about 0.50 percent, by weight, based on said compostiion, of finely divided calcite having a particle size not greater than about 200 microns and (b) from about 0.5 to about 2.0 percent by weight, based on said composition, of a fatty alcohol containing from 10 to 22 carbon atoms, heating said composition to a temperature above the melting point of said polycarbonamide, shaping said molten composition in a shaping device to the desired form of said article, and cooling the shaped molten composition to a temperature below the melting point of said polycarbonamide.

7. The process of claim 6 wherein said polycarbonamide is a condensation product of caprolactam.

8. A process for fabricating a shaped article comprising forming a melt of a polycarbonamide containing from about 0.05 to about 0.50 percent, by weight, based on said melt, of finely divided calcite having a particle size not greater than about 200 microns and about 0.5 to about 2.0 percent, by weight based on said melt of a fatty alcohol containing from 10 to 22 carbon atoms, shaping said melt into the desired form of said article, and solidifying the shaped melt by cooling it to below the melting point of said polycarbonamide.

9. The process of claim 8 wherein said polycarbonamide is a condensation product of caprolactam.

10. A process of fabricating a shaped article comprising heating a polycarbonamide to above its melting point in the presence of additives comprised of:
(a) finely divided calcite dispersed throughout said polycarbonamide, with said calcite having a particle size not greater than about 200 microns, and
(b) a fatty alcohol containing from 10 to 22 carbon atoms dispersed throughout said polycarbonamide, shaping the molten polycarbonamide into a desired form of said article, and cooling the shaped molten carbonamide to a temperature below the melting point of said polycarbonamide for solidification thereof to said article.

11. The process of claim 10 wherein said polycarbonamide is a condensation product of caprolactam, and said fatty alcohol is stearyl alcohol or cetyl alcohol.

12. A process of fabricating a shaped article comprising heating a polycarbonamide to above its melting point in the presence of additives comprised of:
(a) finely divided calcite having a particle size not greater than about 200 microns,
(b) a fatty alcohol containing from 10 to 22 carbons, and
(c) a salt of a fatty acid containing from 10 to 22 carbon atoms.

13. The process of claim 12 wherein said polycarbonamide is a condensation product of caprolactam, said fatty alcohol is stearyl alcohol or cetyl alcohol, and said fatty acid salt is sodium stearate or zinc stearate.

References Cited

UNITED STATES PATENTS

| | | | |
|---|---|---|---|
| 3,214,414 | 10/1965 | Waltersperger | 260—37 X |
| 3,080,345 | 3/1963 | Brooks et al. | 260—37 X |
| 3,052,646 | 9/1962 | Doggett | 260—37 X |
| 3,009,900 | 11/1961 | Hansen | 260—18 X |
| 3,008,908 | 11/1961 | Voight | 260—18 |

FOREIGN PATENTS

| | | |
|---|---|---|
| 654,794 | 2/1965 | Belgium. |
| 969,991 | 9/1964 | Great Britain. |
| 846,907 | 8/1960 | Great Britain. |

DONALD E. CZAJA, *Primary Examiner.*

C. W. IVY, *Assistant Examiner.*